United States Patent [19]

Okada

[11] 3,715,490

[45] Feb. 6, 1973

[54] CAMERA TUBE RESIDUAL IMAGE ELIMINATION APPARATUS

[75] Inventor: Takashi Okada, Tokyo, Japan

[73] Assignee: Sony Corporation, Tokyo, Japan

[22] Filed: May 25, 1970

[21] Appl. No.: 39,999

[30] Foreign Application Priority Data

May 31, 1969 Japan ................................44/42808

[52] U.S. Cl.......................................178/7.2, 178/5.4

[51] Int. Cl.................................................H04n 5/34

[58] Field of Search..178/7.2, DIG. 29, 5.4 R, 5.4 ST

[56] References Cited

UNITED STATES PATENTS

| | | | |
|---|---|---|---|
| 2,864,887 | 12/1958 | Weimer | 178/7.2 |
| 2,987,645 | 6/1961 | Hudgins | 178/DIG. 29 |
| 3,465,094 | 9/1969 | Biernson et al. | 178/DIG. 29 |
| 2,890,278 | 6/1959 | Seur et al. | 178/7.2 |
| 2,930,929 | 3/1960 | Shelton | 178/7.2 |
| 3,131,254 | 4/1964 | Billard et al. | 178/5.4 |
| 3,069,495 | 12/1962 | Macall | 178/7.2 |
| 3,461,224 | 8/1969 | McMann | 178/5.4 |
| 2,445,040 | 7/1948 | Schade | 178/7.2 |
| 2,689,271 | 9/1954 | Weimer | 178/5.4 |
| 2,733,292 | 1/1956 | Cope et al. | 178/7.2 |

*Primary Examiner*—Robert L. Richardson
*Attorney*—Lewis H. Eslinger, Alvin Sinderbrand and Curtis, Morris and Safford

[57] ABSTRACT

In color video signal generating apparatus which includes a video camera tube such as a Vidicon tube, the output signal often includes a residual image component. The residual image component appears in the picture as a ghost of the previous frame or frames. This invention provides a system for diminishing the residual image component by feeding back a portion of the output signal from the camera to the beam generating portion of the camera tube.

12 Claims, 7 Drawing Figures

INVENTOR.
TAKASHI OKADA
BY Lewis H. Eslinger
ATTORNEY

INVENTOR.
TAKASHI OKADA
BY
ATTORNEY

INVENTOR.
TAKASHI OKADA
BY
Lewis H. Eslinger
ATTORNEY

CAMERA TUBE RESIDUAL IMAGE ELIMINATION APPARATUS

This invention relates generally to a video signal generating apparatus, and particularly to a video signal generating apparatus which produces a video signal in which residual image components are diminished.

Generally, a photoconductive layer on a target structure of a video camera tube such as a Vidicon used in a video signal generating apparatus may be considered as having an electrical equivalent circuit of an infinite number of parallel circuits each consisting of a capacitor and resistor. Light of an image falling on the target produces a voltage on the capacitors in accordance with the intensity of the light. An electron beam is directed against the target causing the capacitors to discharge. The camera tube is so arranged that an electrical signal is extracted from the tube proportional to the capacitors' voltage. During each scan of the electron beam on the target, the capacitors are not completely discharged by the beam and an unwanted voltage remains thereon. This is termed the capacitor and conductive residual image. During the next scan of the target by the electron beam, some of the residual images from the previous scan are removed, but of course the residual image is included in the output signal associated with this next scan. This is referred to as a residual image component in the video signal from the camera tube. This residual image component if not removed will appear in a reproduced television picture. Particularly, if the picture is of a rapidly moving object, a ghost of the object will lag behind the moving object. If the image on the picture is stationary, the residual image may not be noticeable, but for very slow moving objects, there is a blurring of the sharpness of the edges of the object. Residual image components also produce low quality of the reproduced picture due to changes in light intensity, certain color imbalances, etc.

It has been discovered that when the output signal from the camera tube is fed back to the tube, in a particular fashion, to modulate the voltage of the target structure with the electron beam, the residual signal component in the output signal is diminished.

Furthermore, the residual image component is a function not only of the intensity of the light at each particular point of the target, but also is related to the voltage on the target, the total light intensity on the target, various color components, etc. In the new and improved video generating apparatus of this invention, means are provided for diminishing the residual image due to these factors.

One object of this invention is to provide a video signal generating apparatus which produces a video signal with practically no residual image component.

Another object of this invention is to provide a video signal generating apparatus in which one portion of a video signal generated is fed back to the cathode of the image pickup tube to produce a video signal of little residual image component.

According to the invention there is provided a video signal generating apparatus having an image pickup tube with a target structure adapted to receive a light image, and with electron beam generating means for generating an electron beam towards the target to scan the target surface and in conjunction with said target convert the light on said target into an electric signal. The electric signal is applied to a circuit for reversing the polarity of said signal, and the polarity-reversed signal is then applied to the electron beam generating means and thereby diminishes a residual image signal component of said electric signal.

The constructing of illustrative embodiments as well as further objects and advantages thereof, will become apparent when read in conjunction with the accompanying drawings wherein.

Figure 2:
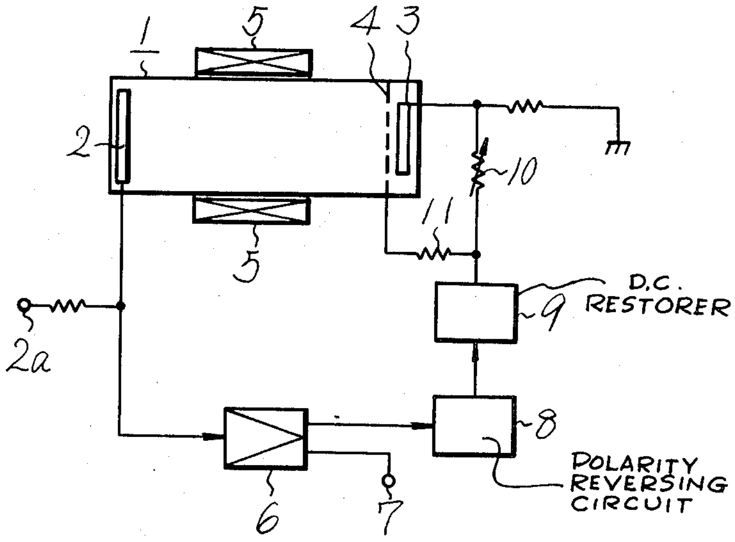
FIG. 2 is a block diagram showing one embodiment of a video signal generating apparatus of the present invention.

With reference to FIG. 2, there is shown an image pickup tube such as a Vidicon or like tube, in which a target structure 2 having a photoconductive layer is located adjacent one end of the tube, and a cathode 3 for emitting an electron beam scanning the target structure 2 is disposed adjacent the other end of the tube remote from the target structure 2.

The target structure 2 is supplied with a power source voltage through a power source supply terminal 2*a*. The tube includes a grid 4 and a deflection device 5 by means of which the electron beam emitted from the cathode 3 is caused to scan the target structure 2 horizontally and vertically with predetermined periods.

With the present invention, in the video signal generating apparatus having the target structure 2 and the cathode 3 for emitting the electron beam scanning the target structure 2, as above described, one portion of a video signal derived from the target structure 2 is fed back to the cathode 3 through a polarity reversing circuit 8 to cause a change in the cathode potential so as to derive from the target structure a video signal with substantially no residual image component. With reference still to FIG. 2, the output signal of the target structure 2 is supplied to a video pre-amplifier 6, and the output signal of which is applied to a video signal output terminal 7 and, at the same time, to a circuit 8 which reverses the polarity of the signal. The polarity reversed signal from circuit 8 is supplied to a DC restorer circuit 9 for clamping the output signal at a predetermined DC voltage level, then through a variable resistor 10 for adjusting the amplitude of the output signal, and then to the cathode 3. The output signal of the DC restorer circuit 9 (which is in-phase with the polarity reversed signal that is fed to the cathode 3) is also applied to the grid 4 through a resistor 11, thereby to avoid variations in the working point of the electrode bias of the image pickup tube so as to prevent a change in the amount of the beam emitted from the cathode 3 when the potential of the cathode 3 changes.

Figure 1:
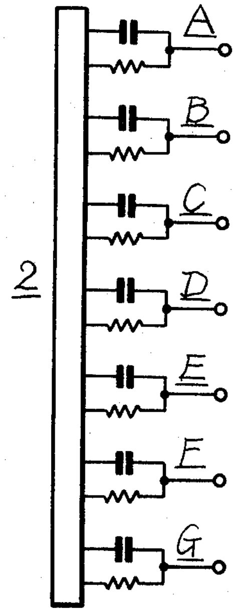
FIG. 1 is a diagram for explaining the present invention.

The further operation of FIG. 2 can be understood with the aid of FIG. 1 in which a portion of the target structure 2 is shown by its electric equivalent resistor and capacitor storage elements A.B.C.D.E.F.G. The elements A.B.C . . . G lie on the target structure 2 in a horizontal direction and are sequentially scanned by the electron beam emitted from the cathode 3. The element A produces a voltage $V_1$ when exposed to light from an object to be televised. When the element A having the voltage $V_1$ is scanned by the electron beam emitted from the cathode 3 (whose potential is assumed to be zero) a signal is derived from the target structure 2 in response to the voltage $V_1$.

The output signal from the tube is then supplied through the DC pre-amplifier 6 to the video signal output terminal 7 and, at the same time, to the polarity reversing circuit 8 for reversal of its polarity to provide a signal $-aV_1$, which is adjusted in amplitude by, for example, the variable resistor 10 and is then applied to the cathode 3. The signal $-aV_1$ is usually selected to be equal in voltage to, but opposite in polarity to, the residual image component remaining on the target structure 2. Accordingly, the cathode 3 has a potential $-aV_1$, and an electron beam for scanning the subsequent element B is emitted from the cathode 3 which is at such a potential. Assuming that the element B has been exposed to the light from the object to produce a voltage $V_2$; then scanning of the electron beam on the element B derives at the output of the target structure 2 a signal in response to $V_2 + aV_1$ and, in this case, the potential of the element B is $-aV_1$. The same operation as just above described is carried out for each of the elements C.D.E . . . . to produce potentials $-aV_2$, $-aV_3$, $-aV_4$ . . . , which are produced in response to those by preceding elements exposed to light. The spacings between the elements A.B.C. . . . are determined by the electron beam velocity, signal detardation and so on and adjacent elements may be regarded as being at substantially the same position. Consequently, assuming that the resulting potentials $-aV_1$, $-aV_2$, $-aV_3$, . . . corresponding to those of the preceding elements produced by the light from the object to be televised are residual image components of the target structure 2, the video signal derived from the target structure 2 in the form of an output is considered to be composed of the signal component produced by the light from the object during a first field and the residual image component produced by the signal component of the first field during a second field. Namely, the residual image component resulting from the signal component of the first field on the target structure 2 during the second field is removed by the signal fed to the target 2 during the first field.

Accordingly, by supplying the target structure 2 with a signal corresponding to, but opposite in polarity to, the residual component to be produced in the subsequent field, a video signal with no residual image component can be produced in the subsequent field.

FIGS. 3 to 6 show other embodiments of the video signal generating apparatus of the present invention and in these Figures similar elements to those in FIG. 2 are marked with the same reference numerals and no further detailed description will be given.

Figure 3:
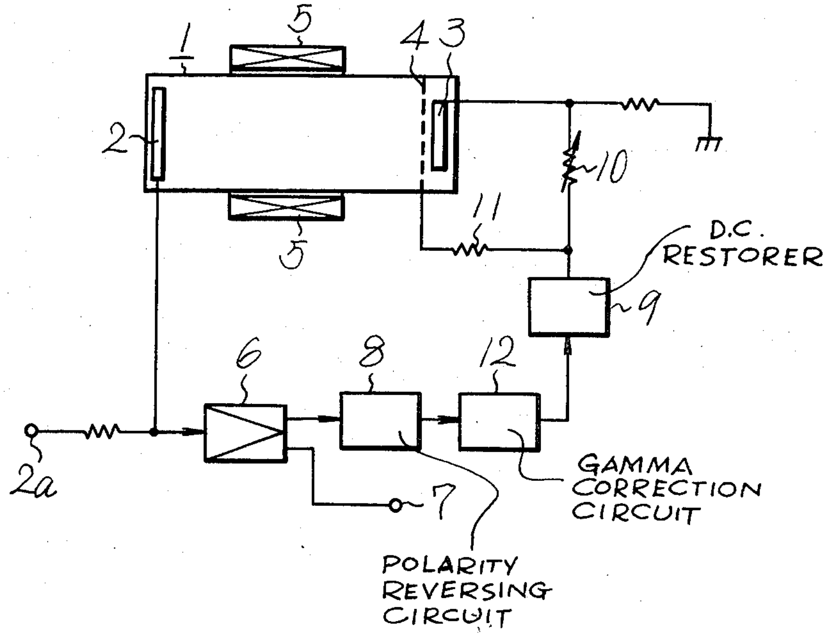
FIGS. 3–6 are block diagrams respectively illustrating other embodiments of the present invention.

In FIG. 3, there is illustrated a modified form of this invention, in which a video signal gamma correction circuit 12 for correcting the nonlinearity of the input signal and a correcting signal is provided between the polarity-reversing circuit 8 and the DC restorer circuit 9, thereby to achieve gamma correction of the signal fed to the cathode 3.

Figure 4:
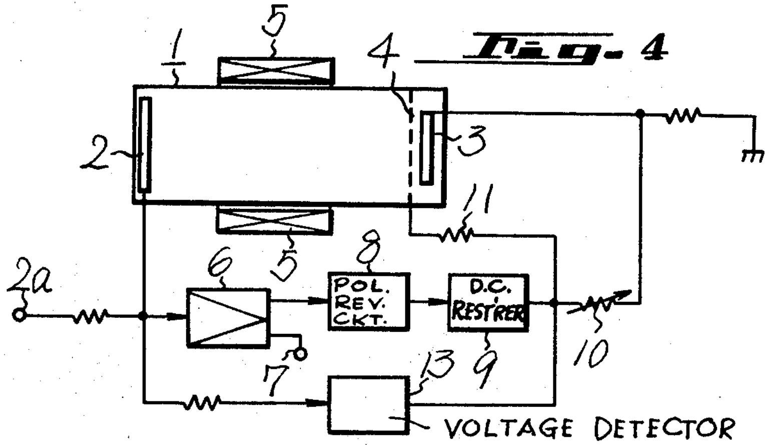

FIG. 4 shows another modification of this invention in which one portion of the output signal of the target structure 2 is applied to a target voltage detector 13 to detect the voltage of the target structure 2 and the detected output is superimposed on the output of the DC restorer circuit 9, thus adjusting the level of the signal fed to the cathode 3 in accordance with the voltage of the target structure 2. Namely, the residual image component varies with the voltage of the target structure. Generally, the residual image component increases with an increase in the voltage of the target structure 2, so that the residual image component can well be removed in the manner above described.

Figure 5:
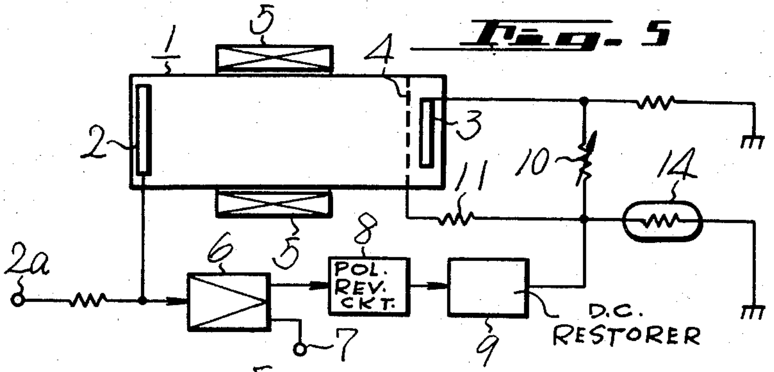

FIG. 5 shows still another modification of the embodiment of the invention illustrated in FIG. 2, and in which a photoelectric conversion element 14 such as a photo-transistor, CdS element or the like is located in the vicinity of the target structure 2 of the image pickup tube 1 thereby to cause the level of the signal applied to the cathode 3 to vary with the output or impedance of the photoelectric conversion element 14. Generally, the residual image component varies with the amount of the light incident upon the target structure 2, but the above arrangement enables automatic changes of the level of the signal fed to the cathode 3 in response to the variation in the residual image component, thus effectively eliminating the residual image component.

Figure 6:
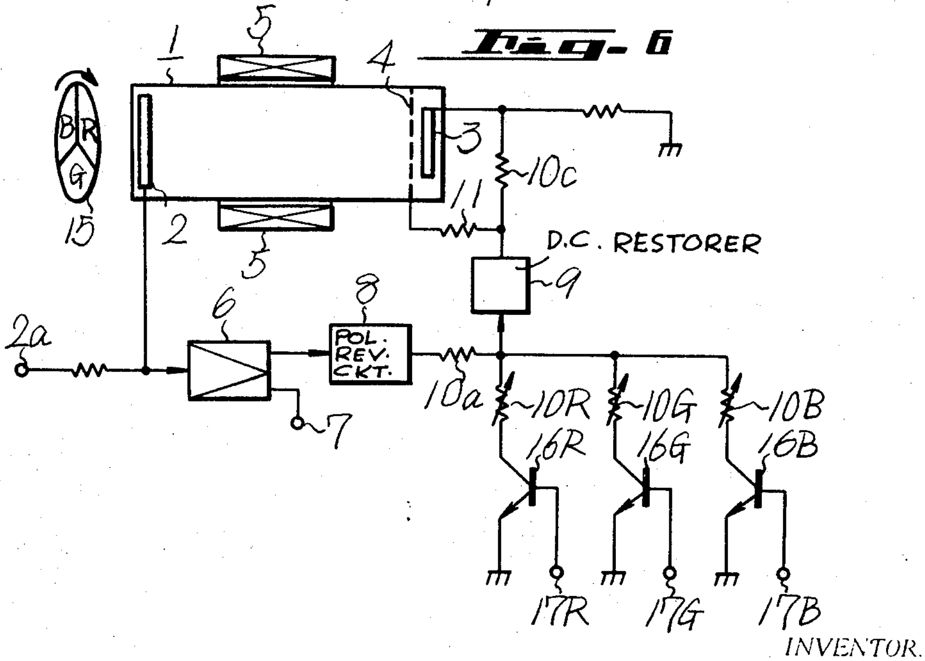

FIG. 6 illustrates one embodiment of the video signal generating apparatus of this invention as being applied to a field-sequential color video signal generating apparatus. In FIG. 6, a rotary color filter 15 is made up of red, blue and green filter elements R, B and G sequentially arranged at equiangular intervals. The rotary color filter 15 is located in front of the target structure 2 and is rotated in synchronism with the vertical scanning period. Accordingly, at the output of the target structure 2 a field-sequential color video signal is derived which consists of red, blue and green color signals repeating at every field. Further, in FIG. 6, the polarity-reversing circuit 8 and the DC restorer circuit 9 of FIG. 2 are interconnected through a resistor 10a and the connection point of the resistor 10a and the DC restorer circuit 9 is connected to a plurality of resistors 10R, 10G, 10B and through a plurality of respective switches shown here as NPN-type transistors 16R, 16G and 16B. Terminals 17R, 17G and 17B are respectively connected to the bases of the transistors 16R, 16G and 16B and are sequentially supplied with a switching signal of the vertical scanning period, respectively in synchronization with the rotation of the rotary color filter thereby to render the transistors 16R, 16G and 16B conducting when the red, blue and green color signals are respectively provided at the output terminal of the target structure. The resistors 10R, 10G and 10B are respectively adjusted for the red, blue and green signals, so that the level of the feedback signal supplied to the cathode 3 is changed when the red, blue and green color signals are being produced. Generally, the residual image components of the target structure 2 due to the red, blue and green signals are different, and the level of the signal fed to the cathode 3 is adjusted by the above arrangement for eliminating the residual image component associated with the different color signals. In this case, the variable resistor 10 in FIG. 2 may be a fixed resistor 10*c*.

Figure 7:
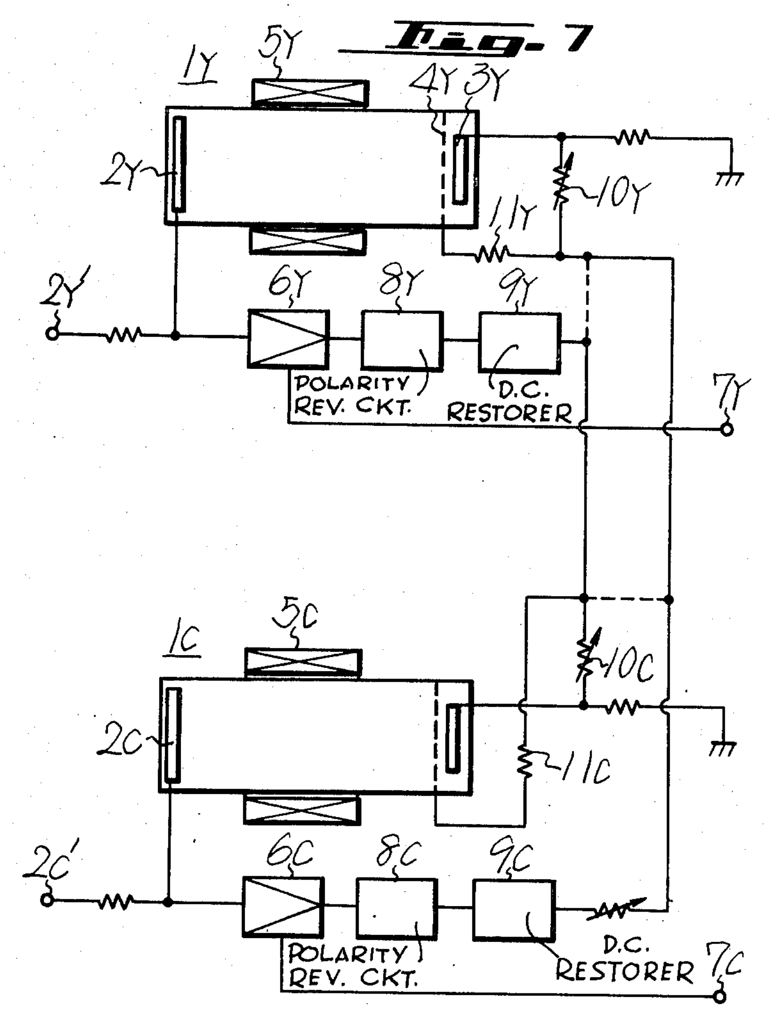
FIG. 7 is a block diagram showing still another embodiment of this invention.

FIG. 7 shows still another embodiment of this invention as being applied in a video signal generating apparatus employing a plurality of image pickup tubes, in which an output from one image pickup tube is reversed in polarity and supplied to the cathode of the other tube. In the case of a two-tube type color image pickup system employing a luminance signal generating tube and a chrominance signal generating tube, the tubes are usually of the same lag characteristics. In FIG. 7, reference numeral 1Y represents an image pickup tube for a luminance signal, and 1C an image pickup tube for a chrominance signal. Similar elements of the tubes are marked with like reference numerals but with the suffix Y for the luminance portion and C for the chrominance portion. Those elements which were previously described in FIG. 2, bear like legends and are not described again. The output signal from the image pickup tube 1C is applied to the cathode of the image pickup tube 1Y after being reversed in polarity by circuit 8C. If the signal fed back to the cathode 3Y of the image pickup tube 1Y is taken as $C'_1$ an output of the tube 1Y becomes $Y_1 + C'_1$ on the assumption that the target 2Y is held at a potential $Y_1$, and $C'_1$ corresponds to a residual image component of the luminance signal expected to be present in the second field. In this case, the potential of the target 2Y in the first field is lowered to $-C'_1$ at the time of generating the output signal. During the second field the luminance signal output $Y_1 + C'_2$ is produced and, in this case, a signal $C'_2$ is supplied to the cathode 3Y of the image pickup tube 1Y from the other tube 1C, by which the residual image signal $C'_2$ can be eliminated by the potential $-C'_1$ of the target structure 2Y produced in the first field, with the result that no residual image signal output appears in the second field. Thus, in the second field, the target structure 2Y has a potential $-C'_2$ corresponding to the residual image component expected in a third field. Consequently, no residual images will be produced in the subsequent fields and the potential of the target 2Y will vary with the residual image component of the preceding field. In this manner, the residual images of the image pickup tube 1Y can be eliminated.

With the above method, the residual image can be considerably removed from the resulting color video signal and, further, if the output of the image pickup tube 1Y is supplied to the cathode of the image pickup tube 1C as shown in FIG. 7, the residual images of the both tubes can be balanced by controlling the amount of the signal fed back to the cathode of either one of the tubes.

In addition, the residual image can be eliminated more effectively by further employing a self feedback system in each tube as indicated by broken lines in FIG. 7.

It will be apparent that many modifications and variations may be effected without departing from the scope of the novel concepts of this invention.

What is claimed is:

1. A video signal generating apparatus comprising an image pickup tube having a target adapted to receive a light image and electron beam generating means including a cathode and a grid for generating an electron beam directed towards said target to scan the surface thereof and in conjunction with said target convert the light received by said target into an electrical output which varies with the intensity of the light received by the areas of said target successively scanned by said beam so as to constitute a video signal; means connected to said tube for receiving a portion of said electrical output and for reversing the polarity of said output portion, and means for applying the polarity-reversed output portion to both said cathode and grid simultaneously so as to modulate the voltage of said electron beam without changing the intensity of said beam, whereby to modify the voltage of said target for diminishing a residual image signal component of said video signal.

2. A video signal generating apparatus according to claim 1, including means for controlling the voltage level of said polarity-reversed output portion.

3. A video signal generating apparatus according to claims 1, which includes means for controlling the voltage level of said polarity reversed output portion, a plurality of color filters adapted to be sequentially disposed in front of said target and means for changing the level of said polarity-reversed output portion in accordance with which of said filters is disposed in front of said target whereby compensation is provided for different residual image components due to different colored light on the target.

4. A video signal generating apparatus according to claim 3, wherein said voltage line controlling means includes means establishing a reference level for each of said filters, said level changing means include a plurality of switches connected to respective reference levels of said voltage level controlling means and said switches are sequentially operated in synchronization with the sequential disposition of said color filters in front of said target to change the level of said polarity-reversed output portion in correspondence with the different filters.

5. A video signal generating apparatus according to claim 1, in which the voltage of the target is modified during the same frame of said video signal constituted by said electrical output.

6. A video signal generating apparatus according to claim 1, in which means are provided for effecting gamma correction of the polarity-reversed output portion applied to both said cathode and grid.

7. A video signal generating apparatus according to claim 1, in which means are provided for sensing the voltage of said target, and adding to said polarity-reversed output portion a signal proportional to said voltage, whereby variations of the residual image component due to variations of target voltage are removed.

8. A video signal generating apparatus according to claim 1, in which photoelectric conversion means are provided near said target for receiving light whose intensity is proportional to the light on said target and for adding an electric signal to said polarity-reversed signal output portion proportional to said received light, whereby variations of the residual image component due to variations in the amount of light incident on said target are removed.

9. A video signal generating apparatus comprising first and second image pickup tubes each having a target adapted to receive a light image and electron beam generating means including a cathode and a grid for generating an electron beam directed towards said target to scan the surface thereof and in conjunction with said target convert the light received by said target into an electrical output which varies with the intensity of the light received by the areas of the respective target successively scanned by the beam so as to constitute a video signal; means connected to said first one of said tubes for receiving a portion of said electrical output therefrom and for reversing the polarity of said output portion; and means for applying the polarity-reversed output portion to both said cathode and grid simultaneously of the electron beam generating means of the second of said tubes so as to modulate the voltage of said electron beam in said second tube without changing the intensity thereof, whereby to modify the voltage of the target of said second tube for diminishing a residual image signal component of the video signal from the second tube.

10. A video signal generating apparatus according to claim 9, further including means for applying said polarity-reversed output portion of said first tube also to both said cathode and grid simultaneously of the electron beam generating means of said first tube.

11. A video signal generating apparatus according to claim 9, which further includes means for receiving a portion of the electrical output from said second tube and for producing a polarity-reversed second output portion therefrom, and means for applying said polarity-reversed second output portion of said second image pickup tube to both said cathode and grid simultaneously of the electron beam generating means of said first image pickup tube.

12. A video signal generating apparatus according to claim 11, in which at least the polarity-reversed output portion from one of said first and second image pickup tubes is applied to said cathode and grid simultaneously of the electron beam generating means of the same tube from which it originated.

* * * * *